2,855,403

NONFLOCCULATING, NONCRYSTALLIZING PHTHALOCYANINE PIGMENTS

Wilbur H. McKellin, Snyder, N. Y., and Harold T. Lacey, Westfield, and Vito A. Giambalvo, Middlesex, N. J., assignors to American Cyanamid Company, New York, N. Y., a corporation of Maine No Drawing. Application February 16, 1956
Serial No. 565,784

20 Claims. (Cl. 260—314.5)

This invention relates to the preparation of phthalocyanine pigments, and more particularly, to the preparation of nonflocculating, noncrystallizing phthalocyanine pigments. This application is a continuation in part of application Serial No. 354,892, filed May 13, 1953, now abandoned.

Phthalocyanine pigments have many important technical advantages and are outstanding in many of their pigmentary properties, particularly their tinctorial properties and lightfastness qualities, which make them especially desirable pigments for use in paints, enamels, lacquers and similar coating compositions. However, when ordinary phthalocyanine pigments are used in such coating compositions, a serious disadvantage, known as "flocculation" occurs. Flocculation is a coalescence of pigment particles into a loose, cluster-like structure which causes the different colored particles to separate from the paint, enamel or lacquer. This phenomenon is especially observed when such coating compositions are dried, in that there is a lack of uniformity of dispersion of the pigment present, and the dry film is characterized by a nonuniform, mottled effect, which affects adversely the gloss, smoothness and color value of the coating composition.

Many of the important coating compositions of commerce include nitrocellulose, which exerts an undesirable effect on ordinary phthalocyanine pigments. Difficulties due to flocculation in such compositions represent a serious practical problem. Not only is there a tendency for the particles to flocculate and to give nonuniform results, but the degree of flocculation of the same coating composition is not constant with different methods of application. For example, when the coating composition is sprayed onto an object, the flocculation is much less than when the object is dipped in the same coating composition. In the latter case, the pigment appears to be weaker tinctorially and off-shade. In a number of practical applications, some parts of an object must be sprayed and others dipped. For example, automobile fenders are frequently dipped while the bodies are sprayed. Scratches or blemishes in sprayed articles must be "touched up," and it is in particular convenient if this can be done on an assembly line or subsequently with a brush. Such "touching up" is a particularly rigorous test of nonflocculation.

It is known that the loss in color value of a dipped lacquer film on drying will give a measure of the degree of flocculation of the pigment in that lacquer formulation. By comparison of the color value of a sprayed lacquer film with a dipped lacquer film, it is thus possible to determine the loss in color value and hence degree of flocculation in the dipped film by the difference in strength. Such tests on ordinary copper phthalocyanine in a lacquer or enamel formulation may show as much as 30 to 60% weakness in color value in the dipped or flowed sample, as compared to the sprayed sample.

Many attempts have been made in the past to obtain pigments of the phthalocyanine series which do not suffer from this defect. The only method, however, which has achieved any degree of commercial success resides in intimately incorporating aluminum benzoate with a phthalocyanine so as to produce a composite pigment. While the resulting product is adequately resistant to flocculation, it suffers from the serious defect that the tinctorial strength is reduced by about 50% because of the diluent present.

Another serious disadvantage possessed by ordinary phthalocyanine pigments is crystal growth. Crystal growth is a characteristic which has an adverse effect on the uniformity and reproducibility of the color coating. In the presence of solvents in which a compound has even slight solubility, the process of dissolution and recrystallization normally proceeds. The tendency is for the smaller crystals to dissolve faster, with the result that the material as a whole appears more and more to consist of larger and larger crystals. Copper phthalocyanine pigments are no exception to this phenomenon. Since the strength of the color of a pigmented coating composition is dependent on the particle shape and size of the pigment, this problem of crystal growth is a serious one, because it reduces the tinctorial value in the coating composition.

It has been proposed to overcome this disadvantage of crystal growth in phthalocyanine pigments by halogenation. While this treatment produces a satisfactorily crystallization-resistant pigment, the shade is changed to a greener hue. Such a pigment is still subject to flocculation.

In accordance with the present invention, it has been discovered that it is possible to produce phthalocyanine pigments which are both nonflocculating and noncrystallizing. The products of the present invention are completely stable to crystal growth in aromatic solvents, and hence may be incorporated into coating compositions and stored for long periods of time without exhibiting any change in shade or strength. Additionally, the products of the present invention are nonflocculating, and hence coating compositions containing the pigments of the present invention have similar shades and strength regardless of the mode of application of the coating composition.

The pigments of the present invention have a further advantage over those known heretofore in that a wide range of shades from reddish blues to greenish blues, as compared to unsubstituted acid-pasted copper phthalocyanine pigments, can be prepared. The conditioning method of the past procedures discussed above uniquely fixed the shade of the pigment, thereby depriving the user of flexibility of shade. The products obtainable by the process of the present invention, on the other hand, constitute a marked improvement over those known heretofore, in that it is possible to prepare a full strength pigment which not only has the desirable characteristics of noncrystallization and nonflocculation, which heretofore were available, if at all, only in separate pigments, but the shades of the blue pigment can be varied from reddish bludes to greenish blues as desired.

It is a further advantage that the products of the present invention have excellent working properties and are useful in surface coating compositions and particularly in lacquers, enamels, organosols, and plastisols for metal finishes, such as automotive finishes. Heretofore, phthalocynanine pigments had to be prepared specifically for use in one or the other of these types of coating compositions. The products of the present invention, on the other hand, have almost universal applicability in coating compositions, and no longer is it necessary to prepare a pigment having either one or the other of the foregoing desirable characteristics for any particular segment of the trade. Instead, the products of the present invention being both crystallization-resistant and nonflocculating, provide the user, in one pigment, with properties which have heretofore been obtainable only in separate pigments, and which had to be prepared by rather expensive and time-consuming procedures.

Essentially, the present invention comprises reacting a phthalimidomethyl- or an o-carboxybenzamidomethyl-substituted phthalocyanine, which compounds are classed as N-(phthalocyanylmethyl)phthalic amides, which contains not more than 2 of these substituent groups per molecule, with a nitrogenous base, such as ammonia or an aliphatic primary amine, as more particularly hereinafter described, in amounts at least substantially stoichiometrically equivalent to the molar amounts of the phthalimidomethyl- or the o-carboxybenzamidomethyl-groups present, plus any other acidic group which may also be present. The number of such phthalimidomethyl- or o-carboxybenzamidomethyl-groups per phthalocyanine molecule may vary below 2 per molecule. With above 2 such groups per molecule the pigments when subjected to the treatment of the present invention, have been found to be more soluble in water than is generally desirable in a pigment.

In practice, it has been found that effective nonflocculating phthalocyanine pigments can be produced when the number of such groupings present is a very small fraction of the number of phthalocyanine molecules present. For example, with as little as one phthalocyanine molecule in 100 bearing such phthalimidomethyl- or o-carboxybenzamidomethyl-groups, the products of the present invention have been found to have nonflocculating and crystallization-resistant properties. Such low degrees of substitution can be achieved, either by direct introduction of only small proportions of the phthalimidomethyl- or o-carboxybenzamidomethyl-groups or by the blending of unsubstituted phthalocyanine either in the wet or dry state before or after the treatment with the nitrogenous base, or in the final vehicle with the above described substituted phthalocyanines which have been treated in accordance with the present invention. A phthalimidomethylphthalocyanine is hydrolyzable to an o-carboxybenzamidomethylphthalocyanine. In the treatment of phthalimidomethylphthalocyanines with nitrogenous bases as herein described, the final products have essentially the same characteristics as if the corresponding o-carboxybenzamidomethylphthalocyanine is treated with the same nitrogenous base. It may be that hydrolysis occurs during the treatment with the nitrogenous base, thus giving products with essentially the same properties. The hydrolysis of the imido-group is not easily proven. Accordingly, the process may be simplified by not separately hydrolyzing the imido-linkage; and starting materials with varying degrees of hydrolysis are conveniently used. Because this phase of the chemistry is obscure, the present invention is not predicated on any particular theory of reaction.

The nonflocculating effect of the nitrogenous base treated N-(phthalocyanylmethyl)phthalic amide is remarkable in that all of the pigment material need not be treated. The nonflocculating pigment may be prepared by attaching phthalic amidomethyl linkages to part of the phthalocyanine, and then treating with the nitrogenous base, or by blending the phthalic amidomethyl-ated phthalocyanine with another phthalocyanine, and then treating with the nitrogenous base, or the treated phthalocyanine pigment may be blended with other flocculating pigments, before or during or after the incorporation of the pigments into a vehicle to form a paint, enamel or lacquer. For example, a lacquer containing the present nonflocculating pigment may be mixed with a lacquer containing a flocculating pigment, which may be a phthalocyanine pigment, or other flocculating pigment, and the nonflocculating characteristics are enhanced.

A smaller number of phthalic amidomethyl groups are required for effective nonflocculation control if the pigment in the chosen vehicle is only slightly flocculating. A small quantity of the substituent groups will increase the nonflocculating characteristics, even if sufficient is not present to cause the formulation to be completely nonflocculating. It is obviously within the control of the formulator to produce a product with such degree of nonflocculating properties as may be desired under particular conditions. As little as one nitrogenous base treated phthalic amidomethyl group per 100 pigment molecules is effective in reducing the degree of flocculation to a useful extent; and up to two such groups per molecule may be useful in some instances.

Since the nitrogenous base treated N-(phthalocyanylmethyl)phthalic amides of this invention embody an extra step in their manufacture and as a consequence are more costly than ordinary phthalocyanines, it is desirable to be economical in their use.

The optimum amount of substituted product necessary for meeting the trade requirements for nonflocculation varies with the type and former history of the ordinary phthalocyanine or other pigment to be employed in the preparation of blends.

In general, phthalocyanine blues conditioned by acid pasting require a larger proportion of the substituted product of this invention than do phthalocyanines conditioned by salt-grinding or salt-milling.

Nonflocculating pigments of various shades can likewise be obtained by blending other flocculating pigments with the above-described substituted phthalocyanines which are subjected to the treatment of the present invention. Among the other pigments which can be used in preparing blends in accordance with this aspect of the present invention are vat and anthraquinone pigments such as indigos, thioindigos, alizarines, anthraquinone azines, dibenzanthrone derivatives, anthraquinone azoles, isodibenzanthrones, flavanthrones, and the like. The same phenomena is also found with inorganic pigments such as titanium dioxide, antimony oxide, and their blends. The tendency of these inorganic pigments to flocculate is inhibited by blending with the nitrogen base treated N-(phthalocyanylmethyl)phthalic amides. Surprisingly in addition to the nonflocculating characteristics, the present blends show crystallization resistance that is superior to the corresponding unsubstituted pigments. For example in enamels, an unsubstituted pigment which loses 50% of its strength, when tested for 600 hours at 130° F. in toluene, when blended with sufficient of the nitrogen base treated N-(phthalocyanylmethyl)phthalic amide to give 10 amido groups per 100 phthalocyanine moieties, shows no loss of strength due to crystal growth.

The phthalimidomethyl- and o-carboxybenzamidomethylphthalocyanines, which form the starting materials for the process of the present invention, may be prepared according to the procedure described and claimed in the copending application of Harold T. Lacey, Serial No. 234,470, filed June 29, 1951 (now abandoned), a continuation-in-part of which, Serial No. 354,897, filed May 13, 1953, issued as Patent 2,761,868, September 4, 1956, "Sulfonated and Unsulfonated Imidomethyl Carboxyamidomethyl and Aminomethyl Phthalocyanines," involving the introduction of phthalimidomethyl- and o-carboxybenzamidomethyl-groups into the phthalocyanine nucleus by reaction of the phthalocyanine in concentrated sulfuric acid solution with methylolphthalimide, for example, at moderately elevated temperatures. The reaction first forms the phthalimidomethyl derivatives which usually are in part hydrolyzed in situ in the reaction mixture to the o-carboxybenzamidomethyl compounds. Complete hydrolysis to the o-carboxybenzamidomethyl compounds is readily achieved if desired by further heating with concentrated sulfuric acid or by boiling with dilute caustic alkali solutions.

Examples of phthalic amidomethyl-groups which may be introduced include phthalimidomethyl- and o-carboxybenzamidomethyl- and their derivatives, in which the phenyl ring may be substituted by other groups, such as nitro-, halo-, alkyl-, and alkoxy.

The amount of the nitrogenous base which is used in the treatment of the phthalimidomethyl- or o-carboxybenzamidomethyl-substituted phthalocyanine in order to produce a nonflocculating, noncrystallizing pigment is not unduly critical. The amount used should be approximately enough to react chemically with the phthalimidomethyl- or o-carboxybenzamidomethyl-groups present. If too little is used, the resulting nonflocculating characteristics of the product are not as pronounced. In practice, it has been found that excess base in the reaction is desirable. If other acid groups, such as sulfonic groups are present on the phthalocyanine nucleus, additional nitrogenous base is required to react with them.

The reaction between the nitrogenous base and the phthalimidomethyl- or o-carboxybenzamidomethyl-substituted phthalocyanines may be carried out either in aqueous or in nonaqueous media.

The length of time the phthalimidomethyl- or o-carboxybenzamidomethyl - substituted phthalocyanine is heated with the treating agent is not critical. In general, the time of treatment will vary with the nature and concentration of the nitrogenous base. Temperatures ranging from a low 45° C. to about 300° C. have been found to produce equally effective results in reasonable times. The use of prolonged treatment at lower temperatures such as room temperatures also produce satisfactory results. The treatment may be carried out under pressure in order to obtain the desired time-temperature relationship.

Among the suitable nitrogenous bases which may be used in the treatment of the phthalic amidomethyl-substituted phthalocyanines to produce the nonflocculating, noncrystallizing phthalocyanine pigments of the present invention are ammonia and aliphatic primary amines such as alkylamines, as for example methyl, ethyl, octyl, ethylhexyl, dodecyl and octadecyl amines; hydroxyalkyl amines, such as ethanolamine and propanolamine; diamines, such as ethylenediamine, and propylenediamine; polyamines, such as diethylenetriamine, bis(aminoethyl)ether, bis-(aminoethyl)sulfide, bis(aminoethyl)sulfone; dialkylaminoalkylamines, such as dimethylaminopropylamine, diethylaminopropylamine, and dibutylaminopropylamine; alkoxyalkylamines, such as 2-methoxyethylamine and 3-ethoxypropylamine; unsaturated alkylamines, such as allylamine and oleylamine; halogenated amines, such as beta-bromoethylamine, and gamma-chloropropylamine; and arylalkylamines, such as gamma-phenylpropylamine; and the like. It is to be understood that the expression "aliphatic primary amine" as used throughout the specification and claims includes all compounds similar to the above-listed class but excludes those amines whose amino-group is attached to an aromatic carbon. There must be one amine group on the molecule which is a primary amine group, although other amine groups elsewhere on the molecule, which may be secondary or tertiary, are not excluded. The amine may have functional groups in its structure which do not enter the reaction. Strongly acid groups tend to enter the reaction and the amine molecule should be free therefrom. The choice of the aliphatic primary amine in the described treatment will depend on the particular vehicle in which the pigment is to be used. The ammonia and the amines can be used either in pure liquid form or in solution in water or in organic solvents.

The nonflocculating, noncrystallizing phthalocyanine pigments which may be used in this invention include both the phthalocyanine molecules, which have the phthalic amidomethyl side chain, and the phthalocyanine molecules which are unsubstituted. The N-(phthalocyanylmethyl)phthalic amides may have substituents on the phthalocyanyl moiety or may have inert substituents on the phthalic acid ring, and the phthalocyanyl moiety may be the same or different from the phthalocyanine molecules present in the pigment. Metal-free phtalocyanines or the metallized pigments containing copper, cobalt, nickel, iron, zinc, tin, or other metal of the co-ordination number of 4 to 6 may be conveniently used. The phthalocyanine may also be substituted by other groups, such as halo-, nitro- or phenyl-groups, or by not more than one acid group such as a sulfonic acid group. These other groups may be present on the phthalocyanine molecules which are not substituted as well as those which are substituted by the phthalic amidomethyl side chain, and in many instances it is difficult if not impossible to determine whether the substituents are present on the phthalic amidomethyl-substituted phthalocyanine molecules or are present on other phthalocyanine molecules. Accordingly, inasmuch as mixtures may be used to get the exact color which is desired and other characteristics which are desired, the final product can only be interpreted as having so many phthalic amido moieties attached through a methyl group onto the phthalocyanine ring, or so many other side chains attached to the phthalocyanine ring and are more easily expressed as substituents per 100 phthalocyanine molecules than in any other fashion.

In certain of the following examples the exact degree of hydrolysis of the phthalimidomethyl-groups attached to the phthalocyanine rings, at the time of treatment with the aliphatic primary amine, is not well established, and accordingly, it must be considered that by following the procedures given, a sufficient degree of hydrolysis has occured, or such other conditions have been fulfilled, and permit the aliphatic primary amine to attach to the phthalocyanine pigment particles in such a fashion as to give the desired nonflocculating, noncrystallizing characteristics which are sought, even though a full and accurate chemical characterization of each molecule, or each type of molecule which is present is not possible with the present knowledge of the state of the art.

The invention will be described in greater detail in conjunction with the following specific examples, in which the parts are by weight unless otherwise specified.

*Example 1*

(Following the procedure of the Lacey Patent 2,761,868)

100 parts of copper phthalocyanine and 39 parts of methylolphthalimide are dissolved in 1375 parts of 100% sulfuric acid. The mixture is heated to 80° C. and held at that temperature until the reaction is substantially complete. 260 parts of xylene sulfonic acid, prepared as described in U. S. Patent No. 2,375,120, is added and the mixture is drowned into 8000 parts of a thin ice slush. The precipitated product is isolated by filtering and washing. The product is dried at 60-70° C. The product is found by analysis to have approximately each molecule of copper phthalocyanine substituted with a phthalimidomethyl-group, although, of course, some phthalocyanine molecules are di-substituted, and some unsubstituted to give the average of one. When the product is tested for flocculation characteristics by the procedure described in U. S. Patent No. 2,327,472, a conventional automotive lacquer, tinted with titanium dioxide to a light blue shade, severe flocculation is observed.

*Example 2*

The product prepared in accordance with the procedure of Example 1 is kept as a wet cake and is reslurried and heated at the boil in 1000 parts of water containing 100 parts of a 68% ethylenediamine solution until the reaction is substantially complete. The product is isolated by filtration, washing and drying. The product is evaluated for flocculation tendencies by the procedure described in U. S. Patent No. 2,327,472. The dipped film shows no flocculation whatsoever as there is no strength difference between the dipped and sprayed films. No change in shade or loss in strength is observed when the product of this example is heated in toluene at approximately 130° F. for 600 hours. The pigment is thus both nonflocculating and noncrystallizing.

*Example 3*

100 parts of the product of Example 2 is mechanically mixed with 400 parts of acid-pasted copper phthalocyanine which by itself flocculates badly in automotive lacquers. The resultant blend is nonflocculating when incorporated into an automotive lacquer. Similar mixtures, made of 20 parts of the product of Example 2 and 80 parts of the vat pigments dichloroisodibenzanthrone or of 1,(S)-2,5,(S)6-bis(2-phenylthiazolo)anthraquinone, which by themselves flocculate in lacquers, after being incorporated into lacquers, are also nonflocculating and are of correspondingly different shades. By varying the proportions, the shade may be changed. Similar nonflocculating pigments are obtained when as high as 1900 parts of acid-pasted copper phthalocyanine or 9900 parts of salt-ground copper phthalocyanine per 100 parts of the product of Example 2 is used. The blends in Example 3 are likewise nonflocculating when incorporated in a conventional automotive enamel.

*Example 4*

The procedure of Example 1 is followed using 78 parts of methylolphthalimide instead of 39 parts as in Example 1. This product, containing twice as many phthalimidomethyl-groups as the product of Example 1 is isolated as described in Example 1 and the wet cake is treated with 2,000 parts of water and 200 parts of 68% ethylenediamine as described in Example 2. The product when isolated by filtration and drying is nonflocculating and noncrystallizing.

*Example 5*

The procedure of Example 2 is followed using 65 parts of 68% ethylenediamine instead of 100 parts as in Example 2. The resulting product is nonflocculating and noncrystallizing.

*Example 6*

The procedure of Example 2 is followed with the exception that the ethylenediamine is increased to 500 parts. The resulting product is nonflocculating and noncrystallizing.

*Examples 7–16*

The procedure of Example 2 is followed with the sole exception that 100 parts, respectively, of:

(7) Ethanolamine
(8) n-Butylamine
(9) Diethylenetriamine
(10) Propylenediamine
(11) 3-dimethylaminopropylamine
(12) 3-dibutylaminopropylamine
(13) 3-ethoxypropylamine
(14) 2-bromoethylamine
(15) Allylamine
(16) Gamma-phenylpropylamine are used in place of the ethylenediamine used in Example 2. The products resulting from these separate amine treatments are essentially nonflocculating and noncrystallizing.

*Example 17–19*

The procedure of Example 2 is followed substituting for the ethylenediamine, 100 parts, respectively, of the water-immiscible amines:

(17) 2-ethylhexylamine
(18) Dodecylamine
(19) Octadecylamine.

The excess amine is removed by steam stripping rather than by water washing as in Example 2. The products resulting from these separate amine treatments, after filtration and drying, are essentially nonflocculating and noncrystallizing in automotive lacquers and enamels.

*Example 20*

The procedure of Example 2 is followed except that the reaction is carried out with 500 parts of 1 N ammonium hydroxide solution at 300° C. in an autoclave. The resulting product is nonflocculating and noncrystallizing. Similar results are obtained by using liquid ammonia instead of ammonium hydroxide.

*Example 21*

The product of Example 1 is stirred at 50–55° C. with 40 parts of toluene and 1 part of ethanolamine until the reaction is substantially complete. The solvents are removed by steam stripping and the product is isolated by filtration, washing, and drying. When incorporated in an automotive lacquer, the product is nonflocculating and noncrystallizing.

*Example 22*

The procedures of Examples 1 and 2 are followed using nickel phthalocyanine instead of copper phthalocyanine. The resultant product is nonflocculating and noncrystallizing.

*Example 23*

The procedures of Examples 1 and 2 are followed using cobalt tetrachlorophthalocyanine instead of copper phthalocyanine. The resultant product is nonflocculating and noncrystallizing.

*Example 24*

260 parts of polyvinyl resin comprising 85–95% vinyl chloride and 15–5% vinyl acetate are hot rolled with 48 parts of di-(2-ethylhexyl) phthalate, 8 parts of Stabilizer A5, 8 parts of dibasic lead phosphite, 90 parts of a rutile $TiO_2$ containing 94% $TiO_2$ and traces of ZnO, $Al_2O_3$ and $SiO_2$, and 10 parts of the product of Example 1 which has been treated until 40% of the copper phthalocyanine blue has been converted to mono-phthalimidomethyl-copper phthalocyanine blue and then treated with an aliphatic primary amine (ethylenediamine) as in Example 2, until a uniform mix is obtained.

60 parts of the above described blend, 80 parts of methyl isobutyl ketone and 80 parts of toluene are mixed in a glass container on a roller mill until a uniform dispersion is obtained. The mixture is further diluted with a thinner consisting of 50% methyl isobutyl ketone and 50% C. P. toluene to give a composition of sprayable consistency. Flocculation tests are then made on baked coatings and air-dried coatings as follows:

In the production of a baked coating, the thinned lacquer is sprayed onto a flat aluminum plate or panel, to produce a relatively thin surface coating. The coated panel is allowed to dry in the air for 30 minutes, is then heated (baked) at 250° F. for 30 minutes, and thereafter cooled to room temperature. A portion of the foregoing described thinned lacquer is then poured onto a portion of the coated-baked panel to produce a second coating. The second-coated panel is allowed to dry in the air for 30 minutes, is then heated (baked) at 250° F. for 30 minutes, and thereafter cooled to room temperature. The color differences between the sprayed coating and the poured coating are described below.

In the production of an air-dried coating, the thinned lacquer is sprayed onto a flat aluminum plate or panel to produce a relatively thin surface coating. The coated panel is allowed to dry in the air at room temperature for one hour. A portion of the thinned lacquer is then poured onto a portion of the coated air-dried panel to produce a second coating. The second-coated panel is allowed to dry in the air at room temperature for two hours. The color differences between the sprayed coating and the poured coating are described below.

Two series of storage tests are made to determine crystallization. Portions of the lacquers are stored at 77° F. and 45% relative humidity for 32 days. Other portions of the lacquers are stored at 130° F. for 32 days. Comparison coatings (air-dried and also baked) as described above are made from: (1) lacquers freshly prepared (zero days), (2) lacquers after storage at 77° F. and 45% relative humidity for 32 days, (3) lacquers after storage at 130° F. for 32 days.

For comparative purposes, a commercially available toner type unsubstituted copper phthalocyanine blue pigment is worked up into a control lacquer by the procedure described above.

The results of these tests are that in every case the flowed panel made from the control was weaker than the sprayed panel. The panels made from the substituted phthalocyanine pigment show absolutely no strength loss of the flowed panel over the sprayed panel. The pigment of this example has no tendency to crystallize during 32 days' storage of these lacquers, whereas the control pigment has a marked tendency to crystallize, indicated by the decreased strengths of the stored lacquer samples.

Example 25

The procedure of the preceding example is repeated except that 10 parts of copper monochlorophthalocyanine is used in the process of Example 1 and is treated until 40% of the copper monochlorophthalocyanine has been converted to mono-phthalimidomethyl copper monochlorophthalocyanine and then treated with an aliphatic primary amine (ethylenediamine) as in Example 2. The thus produced pigment is used instead of the pigment used in Example 24.

The results show that the pigment of this example also has no tendency to crystallize during long storage of these lacquers and has no tendency to flocculate in these lacquers.

When an organosol or plastisol is substituted for the lacquers used and the pigments of Examples 24 and 25 are incorporated therein, no evidence of flocculation of the pigment is observed.

Example 26

A presscake containing 10 parts dry pigment consisting of approximately 30% of tetraphenyl copper phthalocyanine and 70% copper phthalocyanine and containing approximately 10 phthalimidomethyl- substituents per 100 molecules is boiled for 2 hours in 150 parts of water containing 10 parts of 68% ethylenediamine solution. After filtering, washing and drying, the greenish blue pigment so obtained is tested by the procedure described in U. S. Patent No. 2,327,472 and found to be essentially nonflocculating in automotive lacquers.

Example 27

A presscake containing 10 parts dry pigment, consisting of copper phthalocyanine containing approximately 7.5 sulfonic acid substituent groups and 7.5 phthalimidomethyl-substituent groups per 100 molecules is reslurried in 100 parts water containing 10 parts of 68% ethylenediamine solution and boiled for 2 hours. The product is isolated by filtration, washed, and dried. The pigment shows essentially no flocculation when tested by the procedure outlined in Example 2.

Example 28

A presscake containing 10 parts dry pigment, consisting of copper phthalocyanine containing approximately 1.0 sulfonic acid substituent groups and 5 phthalimidomethyl-substituent groups per 100 molecules, is reslurried in 100 parts water containing 8 parts of 68% ethylenediamine solution and boiled for 2 hours. The product is isolated by filtration, washed, and dried. When incorporated in an automotive lacquer and tested as in Example 2, the dipped film shows no strength or shade change when compared with sprayed film.

Example 29

A presscake containing 40 parts dry pigment consisting of approximately 20% mono-phthalimidomethyl copper phthalocyanine and 80% unsubstituted copper phthalocyanine is refluxed in 500 parts dilute caustic soda solution to hydrolyze the phthalimidomethyl-groups to the o-carboxybenzamidomethyl groups. The product is filtered, washed, and dried. 6 parts of this product is acid-pasted, using 98% sulfuric acid as the solvent. This pigment is filtered, washed acid-free, reslurried in water and boiled for 2 hours with an excess of ethylenediamine, using 6 parts of 68% ethylenediamine solution (a 6.5 to 1 mol ratio). After filtering, washing, and drying the pigment, thus obtained, is tested and found to be non flocculating in automotive lacquers and in automotive enamels.

Example 30

A slurry of 89 parts of metal-free phthalocyanine and 39 parts of N-methylol phthalimide in 200 parts of phosphorous pentoxide and 700 parts of 85% phosphoric acid is heated to 70–75° C. and held at this temperature until the reaction is complete, and then drowned in water. The resulting greenish-blue slurry of product is filtered, and the mono substitution product is isolated by washing with acetone and water, and dried.

When the above dried product is tested for flocculation resistance by the procedure of U. S. Patent 2,327,472, severe flocculation is observed.

However, when wet treated with ethylenediamine according to Example 2, no flocculation is observed. In addition the product is resistant to crystallization in toluene at 130° F. for 600 hours.

While the invention has been more particularly described hereinabove in conjunction with the use of phthalimidomethyl- and o-carboxybenzamidomethyl- substituted phthalocyanines as starting materials for the process of the present invention, it is to be understood that any of the o-carboxyamidomethyl- substituted phthalocyanines disclosed in the aforesaid Lacey application may be treated with an aliphatic primary amine or ammonia as herein described to produce non flocculating, noncrystallizing pigments, provided these products are not water-soluble.

We claim:

1. The process of preparing a nonflocculating, noncrystallizing phthalocyanine pigment which comprises reacting metallized and unmetallized phthalocyanine and metallized and unmetallized phthalocyanine substituted with a substituent selected from the group consisting of halogen atoms, and 0 to 1 sulfonic acid groups, and which phthalocyanine is substituted with from 0.01 to 2 aminomethyl substituents selected from the group consisting of phthalimido methyl groups, and o-carboxybenzamidomethyl groups; with a nitrogenous base having at least two hydrogens on the basic nitrogen atom, selected from the group consisting of ammonia, and primary aliphatic amines of the following classes: saturated and unsaturated alkylamines, hydroxyalkylamines, alkylene diamines, polyalkylene polyamines, alkoxyalkylamines, halogenated alkylamines, and arylalkylamines, the quantity of said nitrogenous base being at least substantially stoichiometrically equivalent to said amido groups present plus sulfonic acid groups present; said metallized phthalocyanines being those which have one atom of a metal having a coordination number of 4 to 6 in the center of the molecule.

2. The process of claim 1 in which the phthalocyanine pigment is a chlorinated phthalocyanine.

3. The process according to claim 2 in which the chlorinated phthalocyanine is copper monochlorophthalocyanine.

4. The process according to claim 1 in which the phthalocyanine pigment is copper phthalocyanine.

5. The process according to claim 4 in which the nitrogenous base is an alkylamine.

6. The process according to claim 5 in which the alkylamine is dodecylamine.

7. The process according to claim 4 in which the nitrogenous base is an alkylene diamine.

8. The process according to claim 7 in which the alkylene diamine is ethylene diamine.

9. The process according to claim 4 in which the reaction is carried out in an aqueous solution.

10. The process according to claim 4 in which the reaction is carried out under pressure.

11. The process according to claim 10 in which the compound is ammonia.

12. The process according to claim 1 which comprises blending a flocculating pigment with the nitrogenous base treated N-(phthalocyanylmethyl)phthalic amide, to form a blend, said blend containing at least one amido group per 100 pigment molecules.

13. The process according to claim 12 in which the flocculating pigment is copper phthalocyanine.

14. The process according to claim 12 in which the flocculating pigment is a vat pigment.

15. As a new product, a pigment comprising a phthalocyanine compound, said pigment being characterized by substantial absence of tendency to increase its crystal size with attendant loss in tinctorial strength, when heated in toluene at 130° F. for 600 hours, said pigment being further characterized by substantial absence of tendency to flocculate, with attendant loss in tinctorial strength, when incorporated into paint, lacquer and enamel systems, said pigment being prepared by the process of claim 1.

16. As a new product, a pigment comprising a chlorinated phthalocyanine compound, said pigment being characterized by a greenish shade of blue, said pigment being further characterized by absence of tendency to increase its crystal size with attendant loss in tinctorial strength, when heated in toluene at 130° F. for 600 hours, said pigment being further characterized by substantial absence of tendency to flocculate, with attendant loss in tinctorial strength, when incorporated into paint, lacquer and enamel systems, said pigment being prepared by the process of claim 2.

17. As a new product, a pigment comprising a copper phthalocyanine compound and a flocculating organic pigment, said product being characterized by substantial absence of tendency to flocculate, with attendant loss in tinctorial strength when incorporated into paint, lacquer and enamel systems, said product being prepared by the process of claim 12.

18. As a new product, a pigment comprising a copper phthalocyanine compound and a flocculating copper phthalocyanine, said product being characterized by substantial absence of tendency to flocculate, with attendant loss in tinctorial strength when incorporated into paint, lacquer and enamel systems, said product being prepared by the process of claim 13.

19. As a new product, a pigment comprising a copper phthalocyanine compound and a vat pigment, said product being characterized by substantial absence of tendency to flocculate, with attendant loss in tinctorial strength when incorporated into paint, lacquer and enamel systems, said product being prepared by the process of claim 14.

20. As a new product, a pigment comprising the ethylene diamine reaction product with o-carboxybenzamidomethylphthalocyanine, said pigment being characterized by a substantial absence of tendency to flocculate, and being noncrystallizing when incorporated into paint, lacquer and enamel systems.

References Cited in the file of this patent

UNITED STATES PATENTS

| | | |
|---|---|---|
| 2,744,914 | Rosch | May 8, 1956 |
| 2,759,950 | Tarttes | Aug. 21, 1956 |
| 2,795,583 | Martin et al. | June 11, 1957 |
| 2,795,584 | Martin et al. | June 11, 1957 |
| 2,795,585 | Muehlbauer | June 11, 1957 |

FOREIGN PATENTS

| | | |
|---|---|---|
| 1,057,925 | France | Nov. 4, 1953 |
| 745,465 | Germany | Dec. 2, 1943 |
| 852,588 | Germany | Oct. 16, 1952 |
| 862,817 | Germany | Nov. 20, 1952 |
| 865,926 | Germany | Dec. 24, 1952 |